(12) United States Patent
McNeil

(10) Patent No.: US 6,840,106 B1
(45) Date of Patent: Jan. 11, 2005

(54) SENSOR USING AN ACTUATOR FOR SELF-TEST AND METHOD THEREFOR

(75) Inventor: Andrew C. McNeil, Scottsdale, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 0 days.

(21) Appl. No.: 10/640,724

(22) Filed: Aug. 14, 2003

(51) Int. Cl.[7] ............................................. G01P 15/125
(52) U.S. Cl. ................................. 73/514.32; 73/514.38
(58) Field of Search .......................... 73/514.32, 1.37, 73/1.38, 514.36, 514.38, 862.626, 514.16, 514.18, 862.68, 504.14; 361/280, 283.3, 283.1

(56) References Cited

U.S. PATENT DOCUMENTS

| | | | | |
|---|---|---|---|---|
| 5,618,989 A | * | 4/1997 | Marek | ........................ 73/1.38 |
| 6,070,464 A | | 6/2000 | Koury | |
| 6,122,963 A | * | 9/2000 | Hammond et al. | ....... 73/514.32 |
| 6,158,280 A | * | 12/2000 | Nonomura et al. | ...... 73/504.04 |
| 6,668,614 B2 | * | 12/2003 | Itakura | ........................ 73/1.38 |

* cited by examiner

Primary Examiner—Helen C. Kwok
(74) Attorney, Agent, or Firm—James L. Clingan, Jr.; David G. Dolezal

(57) ABSTRACT

A self-test structure is placed in the middle of a sensing structure that utilizes a movable mass. The sensing structure has portions aligned in two directions that are orthogonal to each other. The self-test structure is an actuator made up of individual sensing patterns. The individual sensing patterns are aligned along a line that is diagonal to the two directions, thereby reducing the number of individual sensing patterns required for the actuator that is used for self-test. The reduced number of sensing patterns results in more mass for the movable mass, thereby improving sensitivity of the sensing structure.

29 Claims, 3 Drawing Sheets

SENSOR USING AN ACTUATOR FOR SELF-TEST AND METHOD THEREFOR

FIELD OF THE INVENTION

This invention relates to sensing structures, and more particularly to sensing structures having a movable mass, wherein the sensing structure has a self-test capability.

RELATED ART

Accelerometers are a common use for sensing structures that have a movable mass. One common use of accelerometers is in airbags in cars. In such use, it is important that the accelerometer be functional. One way this is ensured is by performing a self-test regularly. One convenient time for this is when the car is started. Thus, when the car is started a self-test is performed to verify functionality of the accelerometer.

The accelerometers have had to increase in complexity due to system requirements such as having to detect acceleration in two dimensions instead of just one. This increases the complexity of the accelerometer as well as the accompanying self-test requirements. The increased complexity puts pressure on the size of the accelerometer. There is the continuing desire for the accelerometer to be small but also for it to be accurate. The smaller size makes for the mass of the movable mass to be smaller. The smaller movable mass makes it more difficult to have a sufficiently accurate accelerometer.

Thus, there is a need for a sensing structure with self-test capability with improved accuracy.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

In one embodiment a self-test structure is placed in the middle of a sensing structure that utilizes a movable mass, which is also sometimes referred to as a proof mass. The sensing structure has portions aligned in two directions that are orthogonal to each other. The self-test structure is an actuator made up of one or more fixed electrodes that can apply electrostatic force to the movable mass. The self test actuator is designed to apply a force along a line that is diagonal to the two directions, thereby reducing the number of fixed electrodes required for the actuator that is used for self-test. The reduced number of fixed electrodes required for self-test results in more mass for the movable mass, thereby improving sensitivity of the sensing structure. This is better understood with reference to the drawings and the following description.

Figure 1:
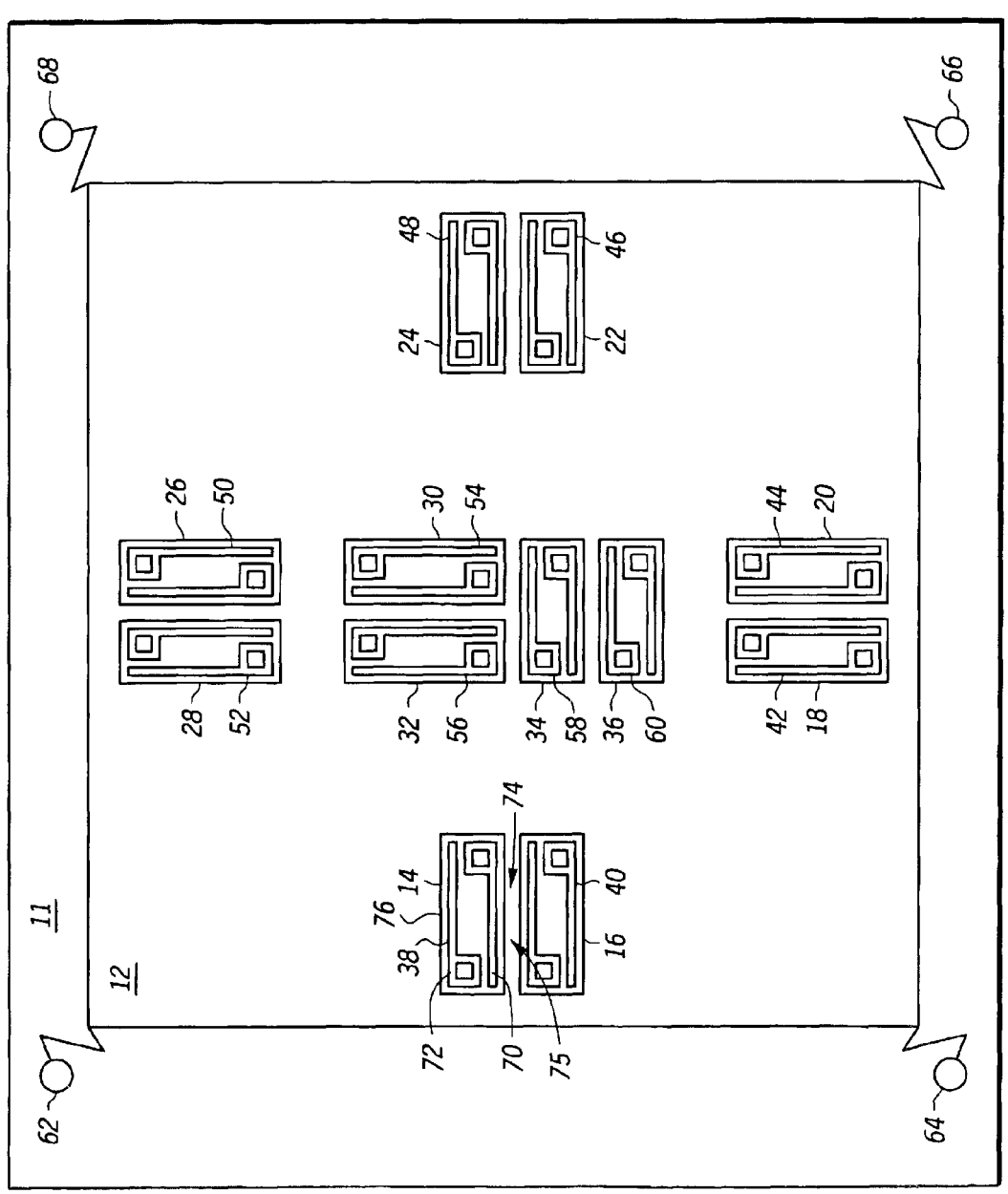
FIG. 1 is a top view of a sensing structure of the prior art.

Shown in FIG. 1 is sensing structure 10 of the prior art that is helpful in understanding the invention. Sensing structure 10 comprises a substrate 11 and a movable mass 12 mounted to the substrate by springs 62, 64, 66, and 68 at corners of movable mass 12. These springs are designed to allow the movable mass to move in any plane (X-Y) direction. Movable mass 12 has a plurality openings comprising openings 14, 16, 18, 20, 22, 24, 26, 28, 30, 32, 34, and 36. Mounted on substrate 12 are a plurality of pairs of fixed fingers comprising fixed fingers 38, 40, 42, 44, 46, 48, 50, 52, 54, 56, 58, and 60 located in openings 14–36, respectively. On each side of movable mass 12 are a pair of openings with a pair fixed fingers inside. For example, on the left side of movable mass 12 are openings 14 and 16 having therein fixed finger pairs 38 and 40, respectively. For clarity in the drawing, only two openings are shown on each side, but many are preferable. For example, 48 on each side has been found to be effective. The openings 14–28 and fixed finger pairs 38–52 form capacitors between the movable mass and the fixed fingers, and these capacitors change when movable mass 12 moves in relation to substrate 11. The openings and fixed finger pairs on opposing sides provide acceleration detection in each of the two orthogonal directions. Thus openings 14, 16, 22, and 24 are used for detecting acceleration in a first direction (first axis of lateral movement) and openings 18, 20, 26, and 28 are for detecting acceleration in a second direction (second axis of lateral movement) orthogonal to the first direction. Movable mass 12 is preferably doped polysilicon but could be another material. Substrate 11 is preferably monocrystalline silicon but could also be another material that is suitable for forming fixed finger pairs thereon.

A self-test structure in the middle of movable mass 12 comprises openings 30–36 having therein fixed finger pairs 54–60, respectively. In the case of the self-test structure, the openings and fixed finger pairs are also aligned in the first and second directions. Openings 34 and 36 are for the first direction and openings 30 and 32 are for the second direction. The self-test structure is designed to move movable mass 12 in response to a bias voltage applied between the fixed fingers and the movable mass. The self-test structure in effect is an actuator, converting electrical signal to physical movement. For example, a bias applied to fixed pairs 58 and 60 relative to the movable mass will achieve movement in the first direction. This movement causes a change in capacitance in the relationship between openings 14, 16, 22, and 24 to fixed finger pairs 38, 40, 46, and 48, respectively. For example, if movable mass 12 moves upward, the edges of opening 14 move in the same way with respect to fixed finger pair 38, which comprises a lower fixed finger 70 and an upper fixed finger 70. The lower edge 74 of opening 14 moves closer to lower finger 70, and the upper edge 76 moves further from the upper fixed finger 72. This causes a change in the capacitance that can be measured to verify that movable mass 12 is still movable and that the capacitance change caused thereby can be measured for the first direction. This process is repeated for the second direction by fixed finger pairs 54 and 56 causing movement of movable mass in the second direction and such movement being detected by causing capacitance change in the relationship of openings 18, 20, 26, and 28 to fixed finger pairs 42, 44, 50, and 52, respectively. Thus there is a set of openings for self-test for each direction being tested. In this case only two openings and fixed finger pairs are shown for the self-test for each direction for clarity of the drawing. In practice, it is preferable to have more, for example, ten for each direction.

Note that a portion 75 of movable mass 12 is between fixed finger pairs 14 and 16. Between each pair of fixed finger pairs has the same type of structure between them as portion 75. Portion 75 is continuous, isthmus-like in being connected to two sections of the movable mass 12. As an alternative, this portion 75 could instead be connected to only one side of movable mass 12 and thereby be peninsula-like and perhaps called a finger. In practice, with perhaps 48 fixed finger pairs on a side, most of the fixed finger pairs will have a portion such as portion 75 on both sides. It is the change in location of these portions that is measured by measuring the capacitance change due to the change in location.

Figure 2:
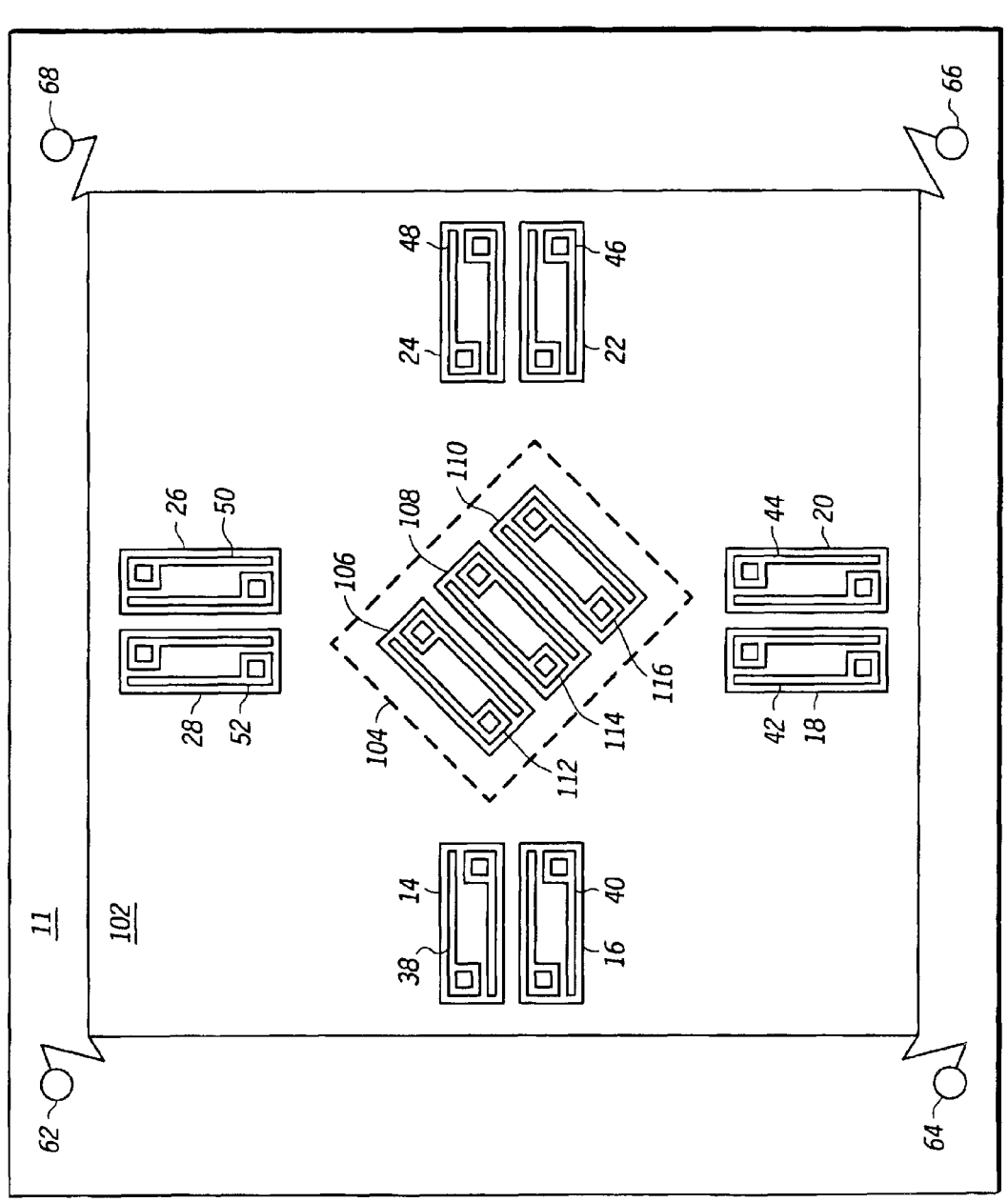
FIG. 2 is a top view of a sensing structure according to an embodiment of the invention.

Shown in FIG. 2 is a sensing structure 100 according to an embodiment of the invention in which common structures to that of FIG. 1 retain common numerals. Sensing structure 100 comprises a different movable mass 102 because of the replacement of the self-test structure of FIG. 1 being replaced by self-test structure 104. Self-test structure 104 comprises openings 106, 108, and 110 having therein fixed finger pairs 112, 114, and 16 on substrate 11. Self-test structure 104 is aligned diagonally with the first and second direction. The self-test operates in substantially the same way as described for FIG. 1 except that both the first direction and the second direction are achieved in a single application because of the diagonal alignment. Thus, application of a bias to fixed finger pairs 112, 114, and 116 results in movement of movable mass 102 in the diagonal direction. The diagonal direction in this case is at 45 degrees to both the first and second direction but could be selected to be a different angles with respect to the first and second directions. This diagonal movement causes movement of movable mass 102 in both the first and second directions that can be measured as a result of the capacitance change caused by the change in location of movable mass 102.

The distance in the diagonal direction, at 45 degrees, to achieve the desired movement in the first and second direction is the square root of two (approximately 1.4) times the desired movement in the first and second direction. This increases the force required by the same multiplier, the square root of two. The movement is spring held so the force required increases linearly with distance. Thus with an increase in distance of 1.4, the force applied to movable mass 102 must be increased by 1.4. This is achieved by increasing the number of openings for self-test structure 104 by 1.4, but only for the diagonal direction, not two directions. Thus, the ratio is 1.4 to 2 for the total number of openings required for the self-test structure for the diagonal case of FIG. 2 as compared to the self-test structure of FIG. 1 that has separate openings for the two directions. Thus, for the same movement in the two directions there is a 30 percent reduction (100)(2-1.4)/2 in the space required for the self-test structure. The total number of openings for the self-test structure would thus go from 40 (20 for each direction) to 28 (20×1.4). The result is that for a given dimension of movable mass 102 there is a reduction in the total amount of opening in movable mass 102, thereby increasing the mass of movable mass 102. The calculated improvement is a 7 percent increase in mass with a corresponding 7 percent increase in resolution for a given set of dimensions of movable mass 102.

Of course all of the openings do not have to the same size so the benefit in the reduction in needed openings as described above can instead be achieved using different size openings suitable for the space available. The space saving will be achieved in total opening space not necessarily in the count of openings.

Figure 3:
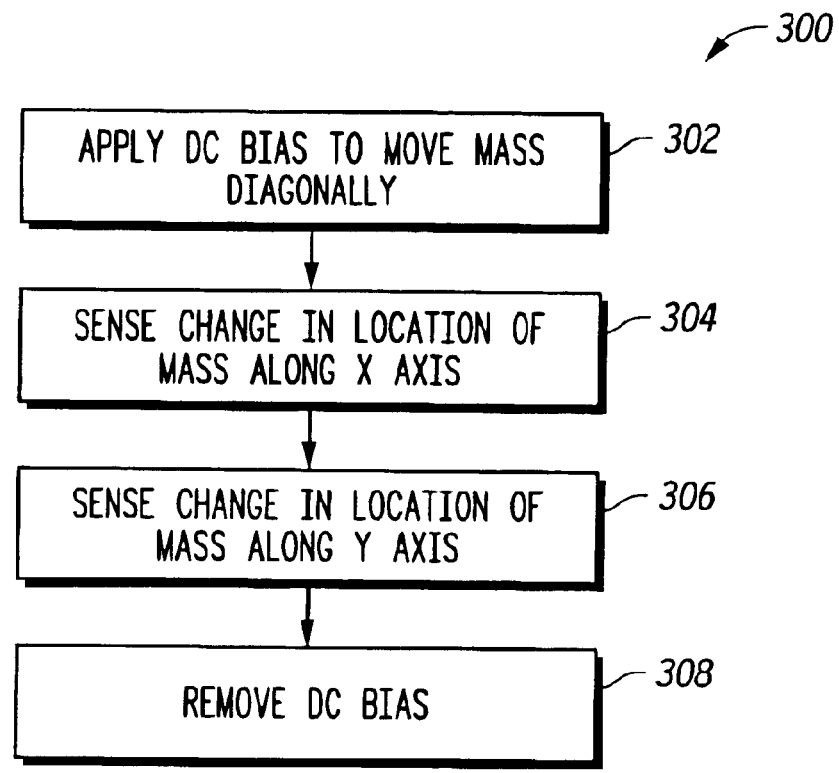
FIG. 3 a flow diagram for using the sensing structure of the embodiment of FIG. 2.

The method of performing the self-test using this structure of FIG. 2 is shown in method 300 of FIG. 3. The first step shown, step 302, is to apply a DC bias to the fixed fingers of the self-test structure to move movable mass 102 diagonally. The next step shown, step 304, is to sense the change in location of movable mass 102 along the X-axis, which can be considered the first direction. The next step, step 306, is to sense the change in location of movable mass 102 along the Y-axis, which can be considered the second direction. The sensing of steps 304 and 305 can be done simultaneously or reversed in order. After the change of movable mass 102 in both the X and Y axes has been measured, the DC bias is removed as shown in step 308. This completes the self-test. The outcome of the self-test will be either a pass or a fail based on the change in location measurements.

Figure 4:
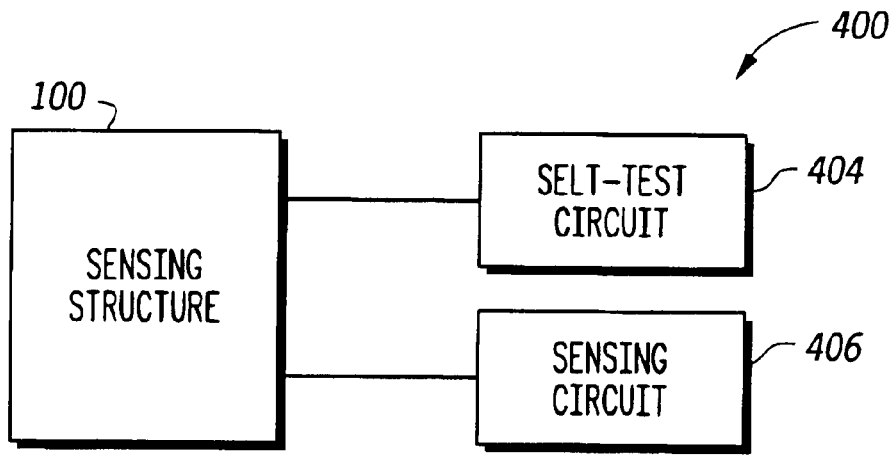
FIG. 4 is a block diagram of a sensing system including the sensing structure of FIG. 2.

Shown in FIG. 4 is a block diagram of circuitry 400 for performing the self-test using the self-test structure of FIG. 2 comprising sensing structure 100, self-test circuit 404 coupled to sensing structure 100 and sensing circuit 406 coupled to sensing structure 100. The self-test circuit 404 is coupled to the fixed finger pairs of self-test structure 104, and sensing circuit 406 is coupled to fixed finger pairs 38–52. This is substantially the same as in the prior art except for the presence of sensing structure 100 in place of prior art structures. The application of DC bias to the fixed finger pairs of the self-test structure 104 is achieved by applying a bias to one finger, the shield finger, of the pair at a voltage that is the same as that applied to movable mass 102. This is preferably about 2.5 volts, but another voltage can be used. A different voltage is applied to the other finger, the active finger, of the pair. This is preferably at about 1.5 volt but could be a different voltage as well. The shield finger, which receives the same bias as the movable mass 102, operates as a shield to avoid acting to counter the force being asserted by the active finger.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not including only those elements but may include other elements not expressly listed or inherent to such process, method, article, or apparatus.

What is claimed is:

1. A sensing structure comprising:
   a substrate;
   a movable mass positioned over the substrate and movable laterally with respect to the substrate;
   a first sensing electrode fixably coupled to the substrate and positioned adjacent to a first portion of the movable mass to form a first capacitive structure for sensing a change in location of the movable mass along a first axis of lateral movement of the movable mass;

a second sensing electrode fixably coupled to the substrate and positioned adjacent to a second portion of the movable mass to form a second capacitive structure for sensing a change in location of the movable mass along a second axis of lateral movement of the movable mass, the second axis is generally orthogonal to the first axis;

an actuating electrode fixably coupled to the substrate and positioned adjacent to a third portion of the movable mass, wherein a voltage differential between the actuating electrode and the third portion provides a force for lateral movement of the movable mass in a diagonal direction, the diagonal direction being at a first angle with respect to the first axis and at a second angle with respect to the second axis.

2. The sensing structure of claim 1 further comprising:

a third sensing electrode fixably coupled to the substrate and positioned adjacent to the first portion of the movable mass on an opposing side of the first portion to form a first differential capacitor with the first sensing electrode for sensing the location of the movable mass along the first axis, wherein the first differential capacitor includes the first capacitive structure;

a fourth sensing electrode fixably coupled to the substrate and positioned adjacent to the second portion of the movable mass on an opposing side of the second portion to form a second differential capacitor with the second sensing electrode for sensing a change in location of the movable mass along the second axis, wherein the second differential capacitor includes the second capacitive structure.

3. The sensing structure of claim 1 wherein the actuating electrode includes a side that is orthogonal to the diagonal direction.

4. The sensing structure of claim 3 wherein the movable mass comprises silicon.

5. The sensing structure of claim 3 wherein the side of the third portion of the movable mass is parallel to the side of the actuating electrode.

6. The sensing structure of claim 1 wherein the first angle is generally 45 degrees and the second angle is generally 45 degrees.

7. The sensing structure of claim 1 wherein the third portion of the movable mass is an extension.

8. The sensing structure of claim 1 wherein the movable mass is made or polysilicon.

9. The sensing structure of claim 1 wherein the movable mass includes an opening, wherein a side of the third portion of the movable mass that faces a side of the actuating electrode is a side of the opening.

10. The sensing structure of claim 9 wherein at least a portion of the actuating electrode is located in the opening.

11. The sensing structure of claim 10 further comprising:

a shielding electrode, at least a portion of the shielding electrode located in the opening between a second side of the opening and the actuating electrode, the second side of the opening being an opposing side of the side of the opening.

12. An accelerometer including the sensing structure of claim 1.

13. A method for moving and sensing a change in location of a movable mass of a sensing structure, the method comprising:

applying a force on the movable mass to laterally move the movable mass in a lateral direction to a first location, the lateral direction being at a first angle with respect to a first axis of lateral movement of the movable mass and being at a second angle with respect to a second axis of lateral movement of the movable mass;

sensing a change in location of the movable mass along the first axis with the movable mass at the first location after the applying;

sensing a change in location of the movable mass along the second axis with the movable mass at the first location after the applying.

14. The method of claim 13 further comprising:

removing the force after the sensing the change in location along the first axis and the sensing the change in location along the second axis.

15. The method of claim 13 wherein the applying the force further comprises:

applying a first voltage differential between the movable mass and at least one fixed electrode adjacent to the movable mass.

16. The method of claim 15 wherein each fixed electrode of the at least one fixed electrode includes a first side facing a first side of a portion of the movable mass, wherein the first side of each fixed electrode of the at least one fixed electrode is oriented generally orthogonal with respect to the lateral direction.

17. The method of claim 15 wherein each fixed electrode of the at least one fixed electrode includes a first side facing a first side of a portion of the movable mass that is generally orthogonal with respect to the lateral direction.

18. The method of claim 13 wherein the sensing structure is pat of an accelerometer.

19. The method of claim 13 wherein the sensing along the first axis includes measuring current flowing through at least one capacitor of a plurality of capacitors, wherein each capacitor of the plurality of capacitors includes a portion of the movable mass.

20. The method of claim 19 wherein the sensor structure includes at least one differential capacitor having a first capacitor and a second capacitor, wherein for each differential capacitor of the at least one differential capacitor, a portion of the movable mass is an electrode for the first capacitor and the second capacitor, wherein the sensing along the first axis includes measuring the current flowing through the first capacitor of the at least one differential capacitor and measuring the current flowing through the second capacitor of the at least one differential capacitor.

21. A sensing structure comprising:

a movable mass positioned over a substrate and movable laterally with respect to the substrate;

a first sensing circuit including at least a portion of the movable mass, the first sensing circuit for sensing a change in location of the movable mass along a first axis of lateral movement of the movable mass;

a second sensing circuit including at least a portion of the movable mass, the second sensing circuit for sensing a change in location of the movable mass along a second axis of lateral movement of the movable mass, the first axis being generally orthogonal to the second axis;

an actuator circuit including at least one electrode fixedly coupled to the substrate and adjacent to a portion of the movable mass, wherein a voltage differential between the at least one electrode and the movable mass provides for a movement of the movable mass in a lateral direction with respect to the at least one electrode, the lateral direction being at a first angle with respect to the first axis and being at a second angle with respect to the second axis.

22. The sensing structure of claim 21 wherein the first angle is generally 45 degrees and the second angle is generally 45 degrees.

23. The sensing structure of claim 21 wherein:
the first sensing circuit includes at least one capacitor, wherein each capacitor of the at least one capacitor of the first sensing circuit includes a portion of the movable mass as an electrode;
the second sensing circuit includes at least one capacitor, wherein each capacitor of the at least one capacitor of the second circuit includes a portion of the movable mass as an electrode.

24. The sensing structure of claim 21 wherein:
the first sensing circuit includes at least one differential capacitor, wherein each differential capacitor of the first sensing circuit of the at least one differential capacitor includes a portion of the movable mass as an electrode;
the second sensing circuit includes at least one differential capacitor, wherein each differential capacitor of the at least one differential capacitor of the second sensing circuit includes a portion of the movable mass as an electrode.

25. An accelerometer including the sensing structure of claim 21.

26. The sensing structure of claim 21 wherein each electrode of the at least one electrode includes a side facing a side of a portion of the movable mass, wherein the side of each electrode is oriented generally orthogonal with respect to the lateral direction.

27. The sensing structure of claim 21 wherein the movable mass includes at least one opening, wherein each electrode of the at least one electrode includes at least a portion located in an opening of the at least one opening.

28. The sensing structure of claim 27 wherein each opening of the at least one opening has a generally rectangular form having sides that are oriented at angles with respect to the first as and with respect to the second axis.

29. The sensing structure of claim 21 wherein each electrode of the at least one electrode is oriented at a third angle with respect to the first axis and at a fourth angle with respect to the second axis.

* * * * *

UNITED STATES PATENT AND TRADEMARK OFFICE
CERTIFICATE OF CORRECTION

PATENT NO.        : 6,840,106 B1
APPLICATION NO. : 10/640724
DATED              : August 14, 2003
INVENTOR(S)      : Andrew C McNeil It is certified that error appears in the above-identified patent and that said Letters Patent is hereby corrected as shown below:

In Column 5, Line 45, Claim No. 8:
    Change "or" to --of--

In Column 6, Line 30, Claim No. 18:
    Change "pat" to --part--

In Column 8, Line 15, Claim No. 28:
    Change "as" to --axis--

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,840,106 B1 |
| APPLICATION NO. | : 10/640724 |
| DATED | : January 11, 2005 |
| INVENTOR(S) | : Andrew C McNeil |

It is certified that error appears in the above-identified patent and that said Letters Patent is hereby corrected as shown below:

In Column 5, Line 45, Claim No. 8:
    Change "or" to --of--

In Column 6, Line 30, Claim No. 18:
    Change "pat" to --part--

In Column 8, Line 15, Claim No. 28:
    Change "as" to --axis--

This certificate supersedes the Certificate of Correction issued May 13, 2008.

Signed and Sealed this

Third Day of June, 2008

JON W. DUDAS
*Director of the United States Patent and Trademark Office*